2,885,394
MODIFIED SACCHARIDE COMPOUNDS

Vincent C. Barry and Peter W. D. Mitchell, Dublin, Ireland, assignors to Lasdon Foundation, Inc., Yonkers, N.Y., a corporation of Delaware No Drawing. Application December 11, 1956
Serial No. 627,551

8 Claims. (Cl. 260—209)

This invention relates to certain novel therapeutic compounds obtained from periodate oxidized polysaccharides, and relates more particularly to an improved solvent process for the preparation of said compounds.

An object of this invention is to provide an improved process for the production of the therapeutic agents obtained by reacting a periodate oxidized polysaccharide with a reactive carbonyl reagent, particularly those containing a free, primary amine group. Other objects will appear from the following detailed description.

Previous studies have shown that by oxidizing polysaccharide compounds with a periodate, the $\alpha$-glycol groupings present are so modified that the oxidized polysaccharide produced reacts as though two potential aldehyde groups exist in each recurring unit of the polysaccharide molecule. The structural change which is brought about by such periodate oxidation appears to introduce the following functional group or linkage into the hexose residues of the polysaccharide:

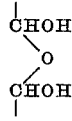

This functional grouping reacts as a carbonyl function under the proper conditions although the oxygen bridge shown would seem to indicate the structure represents a functional grouping where an extra molecule of water links two free carbonyl groups. While the structure does not correspond to the usual concept of a carbonyl group, this grouping will, under the proper conditions, react as a carbonyl group and will condense in approximately equimolecular ratio with a carbonyl reagent, i.e. a compound which reacts readily with a free carbonyl group. The chemistry of the periodate oxidation of polysaccharides has been the object of considerable study and the foregoing is but a brief reference to the known characteristics of these compounds. For the sake of convenience, the oxidized polysaccharides which are within the scope of this invention are referred to hereinafter as those having "potential, hydrated carbonyl functions."

It has now been found that valuable therapeutic compounds are obtained if a polysaccharide compound modified by periodate oxidation and containing potential hydrated carbonyl functions is reacted with a carbonyl reagent such as thiosemicarbazide, an amino-aryl-thiosemicarbazone such as p-aminobenzaldehyde thiosemicarbazone or with a mixture of any of these compounds with isoniazid. The compounds thus obtained appear to contain a heterocyclic ring in which oxygen and nitrogen are a part of the cyclic structure, the linkage appearing to be the following:

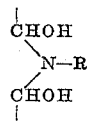

where R is the residue of the carbonyl reagent. These compounds are valuable therapeutic agents and are highly effective as anti-tubercular agents. Similar compounds are obtained by modifying other polysaccharides such as insulin or cellulose by periodate oxidation and reacting the modified polysaccharides with thiosemicarbazide, with an amino-aryl-thiosemicarbazone or with a mixture of any of these compounds with isoniazid. The periodate oxidation of an oligosaccharide such as a di-, tri-, tetra-, penta- or hexa-saccharide also yields compounds containing potential hydrated carbonyl functions which may be reacted in similar fashion with said amino compounds. The periodate oxidation of polyuronides, such as pectic or alginic acid, which are also polysaccharides, also yields intermediate compounds which contain such reactive, potential, hydrated carbonyl functions and which readily react with thiosemicarbazide, an amino-aryl-thiosemicarbazone or with a mixture of these compounds with isoniazid to yield valuable therapeutic compounds.

When the modified polysaccharide is reacted with a mixture of thiosemicarbazide and isoniazid, or a mixture of isoniazid and an amino-aryl-thiosemicarbazone, the product will contain the moieties of each of the reactive amine compounds. In the case of oxidized starch, for example, the reaction of the oxidized starch with a mixture of isoniazid and p-aminobenzaldehyde thiosemicarbazone yields a product in which some of the potential hydrated carbonyl functional groups react with the isoniazid and the remainder with the reactive amino group of the p-amino-benzaldehyde-thiosemicarbazone. The relative ratio of the respective moieties in the product depends largely upon the molar ratio of these reactants in the mixture reacted with the oxidized starch or other polysaccharide. Where a considerable excess of carbonyl agent is employed more than one mol may react. It is believed that under these conditions the ring structure is actually opened up to some extent which allows two free carbonyl groups to react.

In the preparation of these novel compounds, as described in copending application Ser. No. 357,629, filed on May 26, 1953, and which issued as Patent 2,837,509 on June 3, 1958, the periodate oxidized starch or other periodate oxidized polysaccharide is dissolved in water and the aqueous solution obtained is then reacted with an aqueous solution of the desired carbonyl reagent, such as a mixture of p-amino-benzaldehyde-thiosemicarbazone and isoniazid. Because of the relatively low water solubility of certain reactants such as p-amino-benzaldehyde-thiosemicarbazone and of the oxidized polysaccharides, as well, it has been found necessary to employ very large volumes of water for the production of but relatively small quantities of these novel therapeutic compounds. The required use of such large volumes of water creates many practical difficulties where quantity production is aimed at. Even utilizing large scale chemical equipment does not permit production on a commercially desirable scale.

We have now found that the reaction of a periodate oxidized polysaccharide with a carbonyl reagent such as a reactive amino compound to form the novel compounds described may be carried out more efficiently and effectively if said reaction is carried out in an aqueous medium containing a substantial amount of a water-miscible organic solvent.

Most conveniently, the periodate oxidized polysaccharide is prepared in the form of an aqueous solution which is then acidified with acetic acid. To obtain the desired reaction products in accordance with our novel process, this aqueous solution of the oxidized polysaccharide is then combined with a solution of the desired reactive amino compound containing a water-miscible organic solvent. Examples of such solvents are dimethyl formamide, formamide, diethyl formamide, etc. The use of said water-miscible organic solvent greatly increases the solubility of the reactive amino compound or compounds and permits a very substantial reduction in the volume of water required to solubilize said reactive amino compound or compounds thus permitting a greatly increased efficiency in the use of the equipment employed.

In order further to illustrate our invention but without being limited thereto, the following examples are given:

Example I 176 parts by weight of potato starch are slowly added over about 20 minutes to a solution of 255 parts by weight of sodium metaperiodate in 6400 parts by weight of water with stirring. The temperature of the reaction mixture rises from about 29° to 35° C. and stirring is continued for about 48 hours. The oxidized starch is allowed to settle, the supernatant liquid decanted and the oxidized starch washed about eight times (until the last wash gives a negative test for periodate) using 3500 parts by weight of water at each washing. The wash water is decanted after each washing. The washed, oxidized starch is then dissolved in 4330 parts by weight of water by heating for 2½ hours, and after being cooled to room temperature, about 435 parts by weight of acetic acid are added. A separate solution is prepared of 105 parts by weight of p-amino-benzaldehyde-thiosemicarbazone in about 830 parts by weight of dimethylformamide to which has been added 74 parts by weight of isoniazid and about 870 parts by weight of 50% aqueous acetic acid. The aqueous acetic acid starch solution is then added to the dimethylformamide solution with stirring. As the addition proceeds, a precipitate forms. Stirring is continued for one hour and 650 parts by weight of methanol are added. The precipitate is collected on a filter and reslurried in fresh water. The mixture is refiltered, the precipitate washed with small amounts of methanol, then with ether and finally dried at 50–60° C. About 279 parts by weight of the desired product are obtained.

Example II 18 parts by weight of potato starch are oxidized for 48 hours with sodium metaperiodate as described in Example I and the washed, oxidized starch is then dissolved in 450 parts by weight of water.

To 25 cc. of this aqueous solution of oxystarch (containing 6.15 millimoles) are added 2.5 cc. of glacial acetic acid and to the solution thus formed is added a solution of 0.599 gm. of p-aminobenzaldehyde thiosemicarbazone (3.08 millimoles) and 0.422 gm. of isoniazid (3.08 millimoles) in 5 cc. of dimethylformamide and to which 5 cc. of 50% by weight aqueous acetic acid has been added. A precipitate forms as stirring is continued and it is separated and treated as in Example I. About 1.3954 parts by weight of this oxystarch condensation product are obtained which, on analysis, is found to contain 13.92% nitrogen and 4.50% sulfur.

Example III

The process of Example II is carried out, but in this case 100 cc. of the oxystarch solution (24.6 millimoles) are reacted with 4.79 gms. of p-aminobenzaldehyde thiosemicarbazone (24.7 millimoles) and 3.38 gms. of isoniazid. The dimethylformamide solvent and the acetic acid are increased four-fold over the quantities in Example II. A yield of 6.412 gms. of the desired condensation product is obtained containing 16.52% nitrogen and 6.03% sulfur.

Example IV

The procedure above is repeated utilizing 125 cc. of oxystarch solution (30.75 millimoles), 3.99 gms. of p-aminobenzaldehyde thiosemicarbazone (20.6 millimoles) and 1.41 gms. of isoniazid (10.3 millimoles). The dimethylformamide and acetic acid are increased in proportion to the increase in the reactants. A yield of 7.3657 gms. of the desired condensation product is obtained which contains 13.95% nitrogen and 5.98% sulfur.

Example V

In this instance the process of Example IV is repeated but the mol ratios are reversed. Thus, 125 cc. of oxystarch solution is reacted with 1.99 gms. (10.3 millimoles) of p-aminobenzaldehyde thiosemicarbazone and 2.82 gms. (20.6 millimoles) of isoniazid. A yield of 6.3167 gms. of the desired condensation product is obtained which contains 14.65% nitrogen and 3.53% sulfur.

Example VI 125 cc. of oxystarch solution containing 4 gms. of oxystarch in 100 cc. of water (27.7 millimoles) and containing 12.5 cc. of glacial acetic acid, are reacted with 7.98 gms. (41.2 millimoles) of p-aminobenzaldehyde thiosemicarbazone and 2.82 gms. (20.6 millimoles) of isoniazid, the reaction medium containing 66 cc. of dimethylformamide and 66 cc. of 50% aqueous acetic acid. 6.81 gms. of the oxystarch condensation product is obtained which contains 15.56% nitrogen and 7.16% sulfur.

Example VII 125 cc. of the same oxystarch solution as described in Example VI, and containing 12.5 cc. of glacial acetic acid, are reacted with 3.98 gms. (20.6 millimoles) of p-aminobenzaldehyde thiosemicarbazone and 5.64 gms. (61.2 millimoles) of isoniazid in a reaction medium containing 33 cc. of dimethylformamide and 33 cc. of 50% aqueous acetic acid. A yield of 6.1 gms. of the desired condensation product is obtained which contains 17.8% nitrogen and 6.11% sulfur.

The therapeutic action of each of the aforementioned condensation products is substantially equivalent on both an experimental and stastistical basis.

It is understood that the foregoing detailed description is given merely by way of illustration and that many variations may be made therein without departing from the spirit of our invention.

What we claim is:

1. The process which comprises reacting an oxidized polysaccharide having at least two available carbonyl functions with a mixture of isoniazid and p-aminobenzaldehyde-thiosemicarbazone in an aqueous reaction medium containing a water-miscible organic solvent for said mixture.

2. The process as set forth in claim 1 in which the organic solvent is dimethylformamide.

3. The process as set forth in claim 1 in which the organic solvent is diethylformamide.

4. The process as set forth in claim 1 in which the organic solvent is formamide.

5. The process as defined in claim 1, in which the oxidized polysaccharide is a periodate oxidized starch.

6. The process which comprises reacting a periodate oxidized starch having at least two available carbonyl functions with a mixture of isoniazid and p-aminobenzaldehyde-thiosemicarbazone in an aqueous reaction medium consisting of an aqueous solution of dimethylformamide.

7. The process which comprises reacting a periodate oxidized starch having at least two available carbonyl functions with a mixture of isoniazid and p-aminobenzaldehyde-thiosemicarbazone in an aqueous reaction medium consisting of an aqueous solution of diethylformamide.

8. The process which comprises reacting a periodate oxidized starch having at least two available carbonyl functions with a mixture of isoniazid and p-aminobenzaldehyde-thiosemicarbazone in an aqueous reaction medium consisting of an aqueous solution of formamide.

References Cited in the file of this patent

Degering: "An outline of Organic Nitrogen Compounds," published by University Lithoprinters (Upsilanti, Mich.), 1945 (page 644 relied on).

Pigman et al.: "Chemistry of the Carbohydrates," published by Academic Press (N.Y.), 1948 (pp. 210, 211 and 331 relied on).

UNITED STATES PATENT OFFICE
CERTIFICATE OF CORRECTION

Patent No. 2,885,394                                                          May 5, 1959

Vincent C. Barry et al

It is hereby certified that error appears in the printed specification of the above numbered patent requiring correction and that the said Letters Patent should read as corrected below.

Column 1, line 72, for "insulin" read -- inulin --; column 4, line 24, for "(61.2 millimoles)" read -- (41.2 millimoles) --.

Signed and sealed this 6th day of October 1959.

(SEAL)
Attest:

KARL H. AXLINE                                                     ROBERT C. WATSON
Attesting Officer                                                 Commissioner of Patents